Figure 1:
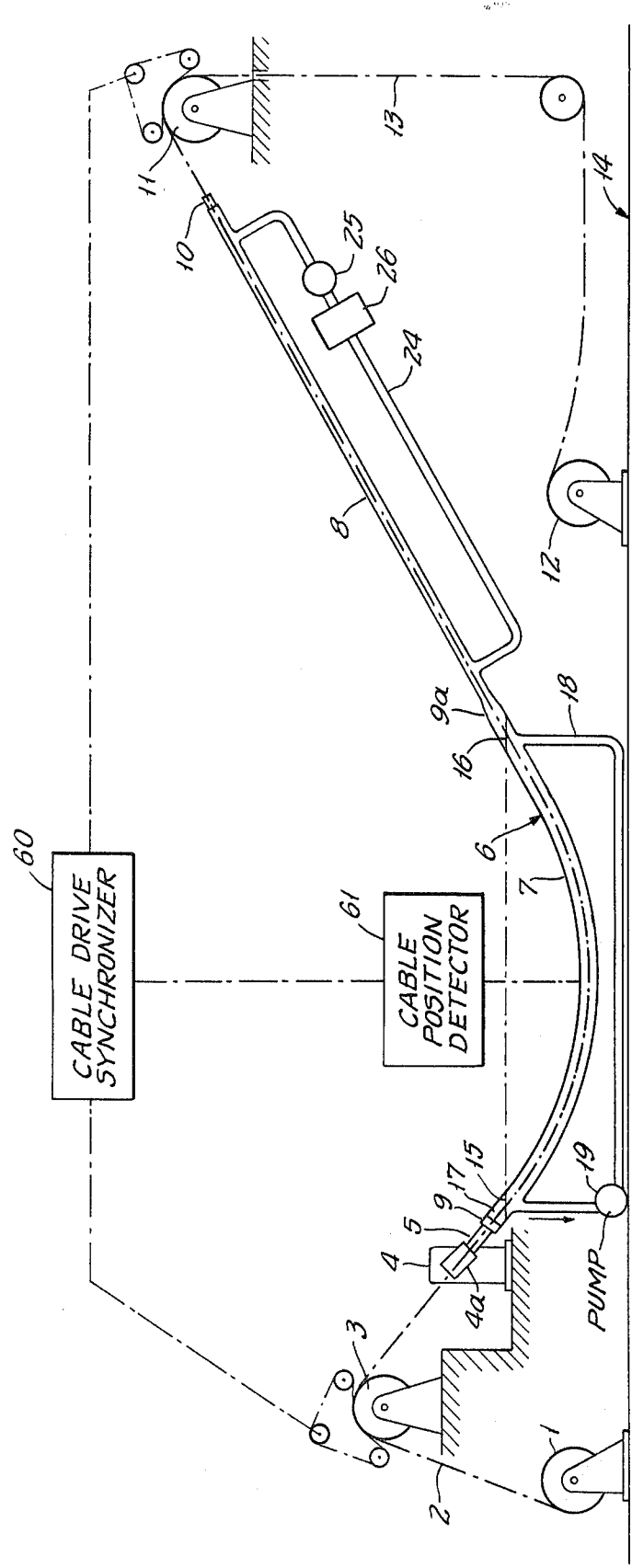

United States Patent [19]

Sarracino

[11] 4,247,280

[45] Jan. 27, 1981

[54] CABLE INSULATION CROSS-LINKING APPARATUS WITH CATENARY AND RECTILINEAR CROSS-LINKING TUBES

[75] Inventor: Marcello Sarracino, Milan, Italy

[73] Assignee: Industrie Pirelli Societa per Azioni, Milan, Italy

[21] Appl. No.: 103,280

[22] Filed: Dec. 13, 1979

[30] Foreign Application Priority Data

Dec. 22, 1978 [IT] Italy .................. 31203 A/78

[51] Int. Cl.³ .................. B29F 3/08; B29H 5/28; B29C 25/00
[52] U.S. Cl. .................. 425/445; 425/122; 425/404
[58] Field of Search .............. 425/113, 122, 404, 445, 425/446

[56] References Cited

U.S. PATENT DOCUMENTS

| | | | |
|---|---|---|---|
| 3,901,633 | 8/1975 | Chrisman et al. | 425/445 X |
| 4,029,450 | 6/1977 | Caser | 425/445 X |
| 4,080,131 | 3/1978 | Bahder | 425/404 X |
| 4,179,256 | 12/1979 | Tomioka et al. | 425/445 X |

Primary Examiner—J. Howard Flint, Jr.
Attorney, Agent, or Firm—Brooks, Haidt, Haffner & Delahunty

[57] ABSTRACT

Apparatus for the continuous cross-linking or vulcanizing of material on a conductor comprising a tube with a vulcanizing section in the shape of a catenary arc with the convex portion facing downwardly and with its ends at substantially the same level and a rectilinear cooling section extending upwardly and with its axis tangent to the axis of the catenary arc at the end of the vulcanizing section which adjoins the cooling section. Hot, non-aqueous liquid is circulated in the vulcanizing section and an inert cooling gas under pressure is circulated in the cooling section, the liquid being exposed to the gas where the sections meet. Inert gas also contacts the liquid at the end of the vulcanizing section remote from the cooling section, and a tank containing the liquid is disposed so that the level of the liquid in the tank is the same as the level of the liquid in the vulcanizing section. In the absence of liquid in the tube, inert gas may be circulated in both sections.

10 Claims, 2 Drawing Figures

CABLE INSULATION CROSS-LINKING APPARATUS WITH CATENARY AND RECTILINEAR CROSS-LINKING TUBES

The present invention refers to a plant or line suitable for extruding and especially suitable for contemporaneously but not necessarily, continuously cross-linking or vulcanizing the material constituting the insulation or the sheath of one or more electrical conductors.

Said material, at the present state of the art, is preferably constituted by a polyolefin or by olefin-elastomeric cross-linkable copolymers, for example, polyethylene or ethylene-propylene rubber.

Particularly, the present invention relates to a plant or line suitable for carrying out the cross-linking or vulcanization method which involves non-aqueous heating and gas cooling of the material and which is described in Italian patent application No. 25 658 A/77 assigned to the assignee of this application. In said method, the insulated conductor or conductors, coming from the extruder, pass, at the extrusion speed, through a heating zone comprising medium viscosity silicone oils (200–300 Centistokes at 25° C.) and through a succeeding cooling zone, comprising an inert gas, preferably, nitrogen.

Of course, the plant or line forming the object of the present invention, is also suitable for other methods for continuous cross-linking or vulcanization, in which, although not using in the heating zone the medium viscosity silicone oils, use a non-aqueous liquid as a heat transmission means and a gas as a cooling fluid.

For a better understanding of the objects of the invention of the present application, it is advisable to consider briefly the present state of the art which relates to the types of apparatus which, in common technical language, are called "continuous vulcanization lines". The latter designation will mostly be used later on even if for the extruded materials now used, it would be more correct to speak of cross-linking instead of vulcanization.

A production line of insulated or sheathed electric conductors generally comprises one or more screw extruders of a known type for applying the different layers of desired materials on the conductor. In the case, for example, of a line suitable for the insulation of medium and high voltage cables, three extrusion machines are generally used. The extrusion machine having greater dimensions provides for the extrusion of the insulating layer, whilst the other two extrusion machines, having lesser dimensions, provide for the extrusion of the thin layers of semi conductive material, having the functions of inner and outer electrostatic screens, respectively. Generally, the extruder for the inner screen is provided with a separate and distinct extrusion head and is arranged in series with the other two which, instead, usually have a common extrusion head.

The cable, after the extrusion phase, passes directly into the vulcanization or cross-linking zone, that is enters into a chamber, preferably under pressure, where it is heated first, and then cooled. The present invention makes use of a vulcanization tube in which the cross-linking or vulcanization process occurs under pressure, in order to assure the compactedness of the cross-linked material and to avoid the formation of bubbles or cavities which could arise in said material if the cable, after the extrusion, is immediately placed at a room pressure.

For the same reason after the heating, because of which the cross-linking process takes place, the cable cooling also takes place before it leaves the pressure chamber.

As is known, the pressure chamber where both the heating and the cooling of the cable, previously insulated or covered or sheathed by extrusion, occur, comprises a long tube, a vulcanization tube, which is connected at one end to the extrusion head and which is provided at the other end with a sealing device which allows to the cable to come out into the outer room while at the same time, limiting the escape of the fluid contained in the tube.

In one type of the conventional plants, the fluids contained in the vulcanization tube are saturated steam for the heating and water for the cooling.

The line of continuous vulcanization having greater application and practical importance is that shaped as a catenary semi-arc for the heating zone, inclined a few degrees with respect to the horizontal and having the higher end placed at the extrusion head and the other end placed in a lower position. The cooling zone is, instead, rectilinear and tangent to the semi-arc of catenary where they join, and therefore, is inclined downwardly at the same angle as the semi-arc of catenary.

The shape of the line, as described, requires that the extrusion machines are mounted in an elevated position, above a platform whose height can be of the order of 10 meters with respect to the final part of the line. This is a great drawback of the conventional saturated steam/water lines which put the most important machinery, requiring a continuous supervision by the operators of the line, in a higher position.

When employing a vulcanization tube having the described shape, the relative position of the two fluids in the tube itself is the neutral one, i.e. the steam is in the higher part and the liquid is in the lower part. The two fluids are in a free and mutual contact without a separator means being between them.

The water, in the inclined straight tube, flows until it reaches a predetermined level which is maintained by means of an appropriate governor which controls the delivery of a pump having the function of compensating the water loss which arises from the final sealing device or which is intentionally caused in order to avoid the overheating of the water itself.

Of course, the line is also provided with those means in common use in the art for the manufacture of electric cables, e.g. means which are provided to give to the cable a uniform movement and at a pre-fixed speed, means which are provided to unwind and to wind the cable, means to drive of the components of line, means to control the operating conditions, etc.

Typical of this type of line is a device able to control the development of the catenary according to which the cable is formed so that it coincides with the shape of the first length of the vulcanization tube.

In spite of the simplicity and practical qualities of using a vulcanization tube having the heating zone with saturated steam and the cooling zone with water, said use has some important drawbacks which became apparent recently when the use of extruded insulation cables has been extended to medium and high voltages.

Said drawbacks, well known to those skilled in the art, can be summed up as follows:

(1) the formation of micro-voids in the mass of the extruded material, produced by the penetration in the mass of saturated steam used for heating the cable and, in a smaller quality, also of cooling water;

(2) the interdependence, for the saturated steam, between the temperature and the pressure, with the consequence that, to avoid too high pressures the temperature must be limited to lower values than those technically permissible. Because of this interdependence the speed of the line and consequently, its productiveness is limited;

(3) the arising on the line, which predominantly extends horizontally, of the "dropping" phenomenon, which occurs when the thickness of the extruded sheath is very high, and, mostly, when the ratio between said thickness and the conductor diameter exceeds a certain critical value. The term "dropping" means that phenomenon for which the mass just extruded tends to drip, in consequency of its weight, with respect to the central conductor constituting its support. As a result of this, the insulating layer, instead of being arranged concentrically with respect to the conductor, becomes disposed highly eccentrically with respect to the conductor, thereby adversely affecting the insulating characteristics of the cable.

In order to prevent at least partially the drawbacks of the saturated steam-water vulcanization, improved plants having a shape different from the conventional one, described above, have been constructed, said improved plants being able to provide vulcanization or cross-linking processes in which, for example, both the heating and the cooling occur in a gas containing chamber (gas/gas type). By means of these systems, it has been possible to eliminate both the formation of microvoids and the above-said drawback of interdependence between pressure and temperature.

However, the use of a gas in place of saturated steam, does not give any advantage with respect to the "dropping" phenomenon.

Among the suggested shapes for the vulcanization of the gas/gas type, there is that shaped as a catenary double arc in which a part of the arc works as a heating zone, and a part as a cooling zone. This line, although permitting the arrangement of all the apparatus (extruder and coilers) in the same plane, requires a deep hole in the ground to receive the cable catenary or if such hole is to be avoided, all the apparatus should be placed on a high floor, giving rise again to the working difficulties of the steam/water line previously described.

In order to prevent also the drawback of the "dropping" phenomenon, other production lines for insulated electric conductors have been proposed in which both for the heating and for the cooling silicone oils are used. It is easy to understand how, with the use of such oils, it is possible to prevent the dripping of the extruded mass.

Thus, the extruded mass, immersed in a liquid and having a specific weight just a little different from the liquid, receives from the latter a buoyancy which is approximately equivalent to its weight. In such a way, the cause, i.e. the gravity force giving rise to the undesirable phenomenon, is offset by the buoyancy force.

However, it has been found by experiment that the use of silicone oil is not advantageous in the cooling phase. In fact, silicone oil, as regards its characteristics of heat transmission, is well suited for the cable heating, but is not as suitable for the cooling of the cable. To appreciate this fact, it is necessary to consider the way in which the exchange of heat between the oil and the cable takes place.

It is first of all obvious that, if one wishes to avoid a reduction of the line speed, the coefficient of heat transmission between the liquid and the cable must have a sufficiently high value. To achieve said result, it is not possible to rely either on the form of heat transmission by conduction, or on that by natural convection, but it is necessary to resort to the forced circulation. Each length of the vulcanization tube, respectively heating and cooling length, is, therefore, provided with a closed path for the fluid circulation, constituted in part by the length of the tube and in part by an outside duct.

In order to obtain good heat transmission characteristics between the liquid and the cable from this force circulation, first of all, it is necessary that the circulation current be under turbulent flow conditions, i.e. that its Reynolds number be higher than the critical one and that its speed be sufficiently high. Said conditions are easy enough to reach in the heating phase in which the oil is fluidized by the high temperature, whereas, in the cooling phase in which the oil has a high viscosity, the conditions are reached with difficulty and only in part.

For example, if a silicone oil of the medium viscosity type (300 Centistokes at 25° C.) is considered, the result is that the viscosity at 200° C., i.e. at the temperature which may be used for the heating phase, is relatively low (30 Centistokes), and this permits, using a moderate circulation speed of the liquid in the vulcanization tube the carrying out of conditions of turbulent flow having a Reynolds number sufficiently high and thereby the obtaining of a good heat transmission from the liquid to the cable. The losses of head are not, in these conditions, very high and therefore a simple centrifugal pump of moderate power is sufficient to assure the circulation.

In the cooling phase, and therefore, with the silicone oil temperature near the room temperature, the viscosity of the oil is very high (300 Centistokes), and this causes great difficulties in using it as a means for taking heat away from the cable. As a matter of fact, even with resort to a circulation speed greatly higher than that used for the heating phase, it is practically impossible to reach a Reynolds number of a value sufficient to guarantee a turbulent flow state.

Therefore, the flow must be maintained in a laminar state, or at the best, semi-turbulent. The coefficient of heat transmission between the oil and the cable is low in these conditions, and therefore, it constitutes a limitation for the production speed of the line.

On the other hand, in these conditions, the losses of head are high, because of the high viscosity and of the relatively high circulation speed and make necessary the use of a rotary pump of great power, which is rather complicated and less reliable. Therefore, it is not possible to think of improving the rate of heat transmission by further raising the circulation speed, because the losses of head would become no longer bearable, without considering that the oil at high viscosity and high speed would exert an important and not desirable dragging action on the cable.

Moreover, it is practically impossible to build a vulcanization tube which uses liquids for heating and cooling without creating a mechanical separation between the heating zone and the cooling one. Without such separation, there would be a mixing between the hot liquid of the heating zone and the cold liquid of the cooling zone. Consequently, it has been proposed to provide some form of sealing means between the two tube zones which permits the passage of the cable and yet avoids the mixing of the two fluids. The provision of sealing means has to be avoided as it complicates excessively the operation of the line.

All the hereinbefore described apparatus also have the drawback of impeding the cross-linking of the first and/or of the last part of the cable.

The present invention has, as one object, the elimination of the drawbacks of the prior art apparatus, and utilizes a line for producing insulated or sheathed electric cables which accomplishes a cross-linking or vulcanization operation by providing a method which will be identified as a "non-aqueous liquid/inert gas" method which subjects the insulation or sheath material to pressure.

At the present time, apparatus capable of carrying out said method are not known, and the known apparatus are unable to accomplish the purpose without being provided with substantial changes which reduce considerably the efficiency of the line or make its use difficult.

Therefore, a further object of the invention is to provide a line comprising a vulcanization tube, particularly suitable for carrying out a non-aqueous liquid/inert gas method, but which has not the undesirable drawbacks of the conventional vulcanization tubes.

Particularly, the vulcanization tube forming part of the line according to the present invention is able to carry out, in a more efficient and natural way, the continuous cross-linking method which comprises the use of a non-aqueous liquid as heat carrying fluid in the heating phase of the cable and of an inert gas as a means for removing heat from the cable in the cooling phase.

Furthermore, the vulcanization tube of the present invention can utilize the relative natural arrangement of the two fluids, the liquid being placed in the lower part and the gas in the higher part of the vulcanization tube. The liquid and the gas are in a free and mutual contact, without it being necessary to provide any mechanical separating means.

Moreover, the vulcanization tube is also such as to permit the complete cross-linking or vulcanization of the insulation or of the sheath of the conductor or conductors, both in the first part of the cable and in the final part of the cable.

More specifically, the main object of the present invention is a line for the production of cables which comprises one or more insulated or sheathed conductors, the preferred embodiment of said line comprising at least: a decoiler of the conductor or conductors; an extruder; a vulcanization tube able to work under pressure, connected to the extruder by means of a telescopic connection and comprising at least a first length or heating zone filled with a non-aqueous liquid and provided with heating means for the liquid, and a second length or cooling zone filled with an inert gas and provided with a cooling means for the gas and with a final sealing means, a closed path for the corresponding fluid circulation being provided for each of said first and second length. Each closed path is constituted by the length itself and by an outside duct associated to the latter, said duct bearing the feeding means, forced circulation means and eventual treatment means for the fluid circulated therein. The preferred embodiment also includes means for the co-ordination of the unwinding speeds of the conductor or conductors and winding of the cable, and said line is characterized by the fact that said vulcanization tube has said first length or heating zone shaped as a complete or symmetrical catenary arc having the convexity directed downwardly and said second length or cooling zone is rectilinear and has its axis tangent to the axis of said first length at the junction section and therefore, said second length is directed upwardly. The non-aqueous liquid in the vulcanization tube contained inside the first length has the respective first and second surfaces thereof at the same level. The second length contains said inert gas, and said non-aqueous liquid and said inert gas are exposed to each other and in mutual contact at an interface coinciding with said second free surface.

Figure 2:
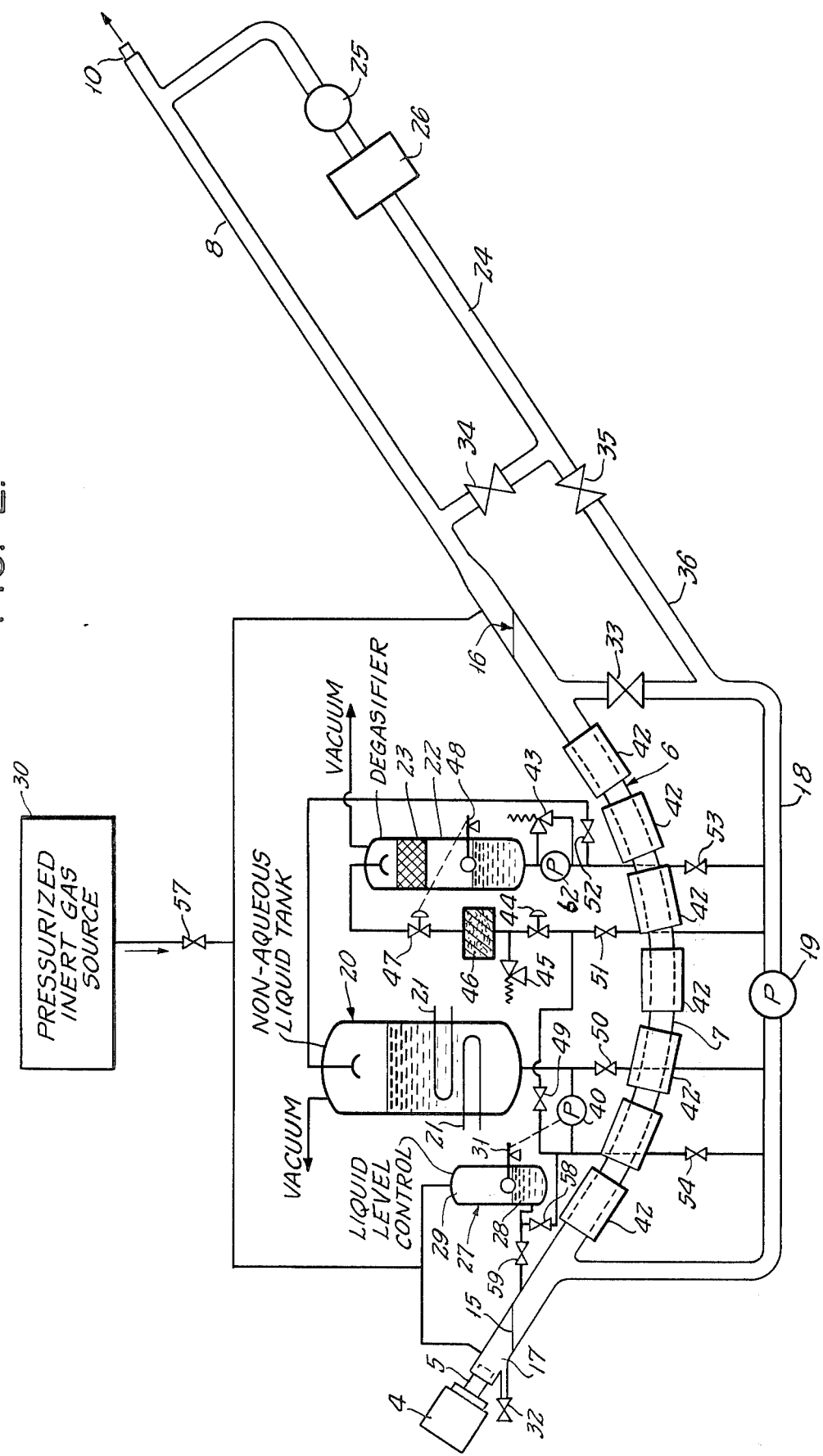

Other objects and advantages of the present invention will be apparent from the following detailed description of the presently preferred embodiments thereof, which description should be considered in conjunction with the accompanying drawings in which:

FIG. 1 represents schematically, partly in section, an elevation view of a part of a preferred embodiment of a line according to the invention; and FIG. 2 represents, also schematically and partly in section, an elevation view of the circulating and treatment systems of the fluids used in the cross-linking or vulcanization process using the line illustrated in FIG. 1.

The vulcanizing or cross-linking line shown, by way of example in FIG. 1, comprises up to the cross-linking or vulcanization phase at least a decoiler 1 for a coil of the conductor 2 to be covered or sheathed, a feeding or thrusting wheel means 3 and an extruder 4.

A retractile connection tube 5, known to those skilled in the art as a "telescopic connection", connects, in a pressure tight manner, the extruder head 4a to the vulcanizating tube 6 which is the cross-linking or vulcanizating pressure chamber. The tube 6 is divided into first and second lengths 7 and 8, respectively.

The first length 7 is shaped according to a complete or symmetrical catenary arc, having the convexity directed downwardly, so that the complete catenary arc lies wholly below the level of the extruder 4. Said length 7 has the first end 9 connected directly to the tube 5, and the second end 9a at the same level as the first and joined to said second length 8.

The second length 8 is constituted by a rectilinear tube, extending upwardly and having its own axis tangent, at the junction section, to the axis of the first length 7 which is shaped as a complete catenary arc. Thus, the axis of the length 8 extends in the same direction as the axis of the length 7 at the junction between the lengths 7 and 8, and the axis of the length 8 may be considered as an extension of the axis of the length 7 at the junction thereof.

A final sealing means 10, of a conventional type, is mounted at the free end of the length 8. The final sealing means 10 is made, for example and preferably, according to the teachings of Italian Pat. No. 947,254 in the name of the assignee of this application.

Down line of the vulcanization tube 6, there are provided at least a traction or pulling wheel means and a coiler 12 for the sheathed conductor or cable 13.

A means of known type, illustrated by the rectangle 60, is also provided for co-ordinating the speed of the wheel means 11, with respect to the speed of the wheel means 3. Said means is controlled by the information sent it by a detector device 61, also of known type, which connects to the vulcanization tube 6 and which detects the position of the cable with respect to the length 7.

The represented wheel means 3 and 11, are of the belt type which engage the conductor 2 and the cable 13 respectively, but the drives for the conductor and cable could also be constituted by other traction means. Moreover, the traction means could be set up, rather than in a higher position with respect to the extruder 4 and to the final sealing means 10, directly at the ground level 14, putting instead in their positions, corresponding to that indicated in FIG. 1, only a transmission wheel.

The first length 7 constitutes the heating zone of the vulcanization tube 6 and is filled with a non-aqueous liquid, whose first free surface 15 and second free surface 16 are at the same level. The non-aqueous liquid is, preferably, but not necessarily, a silicone oil having a viscosity not lower than 150 CST at 25° C. and not higher than 500 Cst at 25° C., as taught in said Italian patent application No. 25 658 A/77.

The silicone oils are choosen, particularly, because they:

Do not react with the material generally used in the art for obtaining the extruded insulation or sheath material.

Have no tendency to penetrate into the extruded mass so that they do not encourage the happening of that phenomenon which is known, to those skilled in the art, as a microvoid formation due to the slow migration towards the outside of the insulation or sheath of the cross-linking or vulcanizating fluids often trapped in said insulation or sheath material;

Permit the reaching of the cross-linking or vulcanizating temperature (about 200° C.) without decomposing or deteriorating;

Permit the setting of the temperature and the pressure of cross-linking to desired values, without a mutual interdependence;

Are able to provide good heat transmission characteristics; and

Have a specific gravity near that of the extruded material, and therefore they permit the suspension of the extruded material in the liquid.

The second length 8 constitutes the cooling zone and is filled with an inert gas, preferably, but not exclusively, nitrogen. Said inert gas can easily coexist with the silicone oil in the same vulcanization tube, without providing separation means between the two fluids, which permits cooling at low pressures and at speeds which can be considered very good. Heat must be removed from the insulation or sheath of the conductor or conductors, after said insulation or sheath has been subjected, in the first length 7, to a cross-linking or vulcanizating process at relatively high temperatures.

The use of an inert gas for cooling the vulcanized or cross-linked sheath of the conductor, has moreover the advantage of exerting no chemical action on the extruded mass. Particularly, nitrogen has been shown to be the more suitable gas to be used in the cooling zone of the vulcanization tube 6, not only because it is neutral, but also because of its low cost and easy availability.

An inert gas, preferably the same as the gas contained in the second length 8 of the vulcanizing tube 6 and at the same pressure also fills a third length 17 of said tube 6 and overlies the free surface 15 of the non-aqueous liquid. Said third length 17 is provided inside the first length 7, near the opening 9 of the vulcanizing tube 6, and over said first free surface 15.

The first length 7 and the second length 8 of the vulcanizing tube 6 are each provided with independent systems for the forced circulation and for the feeding of the fluids therein contained and for eventual treatment of the fluids. Said forced circulation, feeding and treatment systems are schematically illustrated in FIG. 2.

The forced circulation system for the non-aqueous liquid contained in the first length 7, consists of a closed path comprising mainly most of the first length 7 and the pipe or duct 18 connected to the length 7 in a closed circuit. A pump 19, preferably, but not exclusively, a centrifugal pump, is connected in series with the pipe 18.

The following feeding and treatment means are connected to the pipe 18 by suitable connecting and cutting-off means, such as valves, which are not completely shown in FIG. 2:

(1) a tank for said non-aqueous liquid, provided with heating means 21. The tank 20 in its preferred embodiment is kept under vacuum, through a pump for the vacuum (not shown);

(2) a degasifier 22, also connected to said tank 20; the degasifier 22 is of a known type and, in a preferred embodiment could be connected to a pump for the vacuum and could be provided with exposure surfaces 23 for the liquid.

The forced circulation system for the inert gas, contained in the second length 8, consists of a closed path which comprises part of the second length 8 and a pipe or duct 24 connected to the length 8 in a closed circuit.

A blower 25 of a known type, for example, of volumetric or centrifugal type, is connected in series with the pipe 24 and a heat exchanger 26, also of a known type. By way of example, the exchanger 26 may be a gas/water exchanger.

A system for keeping the level of the free surfaces 15 and 16 in the inside of said first length 7 constant is also applied to the vulcanizating line 6. Said system for regulating the level of the non-aqueous liquid in the illustrated example is constituted by a tank or container 27 containing said non-aqueous liquid 28 at the same level as said first and second free surfaces 15 and 16 and is connected to the tank 20 by way of valve 58 and a pump 40. An inert gas column 29, of the same type of gas and at the same pressure as that in the third length 17 and, preferably, also of the same type of gas as that contained in the second length 8, applies pressure to the non-aqueous liquid 28. In the preferred illustrated embodiment the inert gas is delivered to the container 27, to the third length 17 and to the second length 8, by way of a valve 57 from a single source 30.

The container 27 is provided with an automatic level governor 31 answering to the variations of the non-aqueous liquid level in respect to a pre-fixed limit and connected to the delivery pump 40.

A controlled loss valve 32 is provided at the length 17 of the first length 7 of the vulcanizating tube 6.

In a preferred embodiment, the heating system of the first length 7 of the vulcanization tube comprises radiant electric elements 42 enclosed in shells which envelop from the outside said first length 7.

As mentioned hereinbefore, the degasifier 22 is of a known type and is connected to the system in a conventional way. Accordingly, it is not illustrated in detail, but it is shown schematically with some of its associated controls, etc. Liquid entering the top of the degasifier 22 is sprayed on the surface 23 to separate the gases from the liquid and the degasified liquid is removed by a pump 62, preferably a rotary pump associated with an over-pressure, by-pass valve 43. A pressure reducing valve 44 and an over-pressure safety valve 45 are connected to a filter 46 which connects to the degasifier 22 by way of a regulating valve 47 for regulating the flow of liquid into the degasifier 22. The liquid is removed from the degasifier 22 at a constant rate determined by the the positive displacement pump 62. The level of the liquid in the degasifier 22 is maintained by a float mechanism 48 connected to the valve 47.

The liquid in the tank 20 is degasified by making it pass through the degasifier 22. In this operation, the valves 50, 51, 53, 54 and 58 are closed and valves 49, 44, 47 and 52 are open and the pump 40 is operated.

In the preliminary and preparation operations of the line, the vulcanization tube 6 is empty and at room pressure, whereas the telescopic tube 5 is open. In these conditions the heating of the non-aqueous liquid contained in the tank 20, is started through the heating means 21. Thereafter the non-aqueous liquid is degasified, circulating it, in a closed circuit through the degasifier 22. At the same time, the first length 7 of the vulcanizing tube 6 is heated by its aforesaid heating means 42 and the extruder 4 is held at a steady state.

When the liquid in the tank 20 has reached the desired temperature and has sufficiently been degasified, it is let into said first length 7 and into the pipe 18 connected to the length 7. Since, the telescopic tube 5 is open, the filling is made to a safe level with respect to the level of the opening at the end 9 of the vulcanizing tube 6. This is accomplished by operating the pump 40, opening the valve 54 and closing the valves 49, 50 and 52.

In the meanwhile, the known preliminary operations on the cable will be completed, such operations including the building of a head on the conductor 2, the connection of the head to the coiler 12, by means of a tension rod or chain passing through the telescopic tube 5, the vulcanizing tube 6, the traction wheel 11, etc.

At this stage the telescopic tube 5 is closed and at the same time the following operations begin:

the supply of inert gas into the second length 8 of the vulcanizing tube 6, into the pipe 24 connected to the tube 6, into the third length 17, and into the container 27 by opening the valve 57; the activation of the circulation of the non-aqueous liquid in the first length 7 and of the inert gas in the second length 8 by starting the pump 19 and the blower 25, respectively;

the degasifier 22 is inserted in parallel with the return pipe 18 by opening the valves 51 and 53 and by keeping the valves 49 and 52 closed;

the completion of the filling with the non-aqueous liquid of the first length 7 of the vulcanizing tube 6 so that the liquid contained in the same is at the level of the free surfaces 15 and 16, and, contemporaneously, the non-aqueous liquid 28 in the container 27 is brought up to the same level of the pump 40 and opening the valves 58 and 59 while keeping the valves 49, 50 and 54 closed; and the activation on the pipe 18 and down side of the pump 19 of the degasifier 22.

When the above operations have taken place, the extruder 4 is started.

The conductor 2, continuously coming from the decoiler 1 and passing through the thrusting wheel means 3, is sheathed with insulated material inside the extruder head 4a. The insulated or sheathed conductor (called a "cable" hereinafter), which leaves the extruder head 4a, passes through the telescopic tube 5 and then, the third length 17 containing inert gas.

This length 17 containing inert gas constitutes a gas pocket between the extruder head 4a and the free surface 15. Said gas pocket prevents the extruder dies from coming into a direct contact with the hot, non-aqueous liquid adjacent the first length 7 or heating zone, thereby avoiding the risk of a premature cross-linking in the extruder head 4 which would stop the extrusion operation.

A continuous renewal of the inert gas contained in the third length 17, is provided in order to avoid, in its turn, overheating of said gas. Said continuous renewal is obtained by causing a controlled loss through the valve 32.

After passing through the gas in the third length 17, the cable enters the non-aqueous liquid of the first length 7 or heating zone, where circulation of the non-aqueous liquid is caused by means of the pump 19. In a preferred embodiment, in which said non-aqueous liquid is silicone oil, the circulation should reach a speed between 0.5 m/sec and 1 m/sec (speed which could be considered optimum) for obtaining a good heat transmission between the oil and the cable.

When the line works at a steady state, the non-aqueous liquid which, during the preliminary operations has been brought to the temperature required by the vulcanization or cross-linking process, must continuously recover the heat taken away, by the cable, as well as that corresponding to the thermal dissipation. Heat recovery is provided by heating directly from the outside of the walls of said first length 7 of the vulcanizating tube 6, through radiant electric elements 42, enclosed in shells which surround said first length 7. Of course, the heating could be accomplished in another known way, such as, for example, through a heat exchanger connected in the pipe 18.

Proceeding then in its advancing, the cable, after having been subjected to the cross-linking or vulcanizing in the heating zone, passes directly into the cooling zone, corresponding to the second length 8, without passing through a seal or separating means. The non-aqueous liquid of the first length 7 and the inert gas of the second length 8 are in open contact with each other at the interface corresponding to the second free surface 16 without it being necessary to include any separation means.

The inert gas circulating in said second length 8 and in the associated external pipe or duct 24 comes into contact with the cable at a speed (for example, of the order of 25–30 m/sec) which is sufficiently high to assure a good heat transmission between the cable and the gas. The blower 25 is provided to assure the circulation of the inert gas and to overcome the pressure losses linked to said circulation.

The heat exchanger 26, inserted in the pipe 24, takes away the heat given to the gas by the cable, as well as that deriving from any resistance which opposes the cable movement. Therefore, the cable comes out of the final sealing means 10, which permits a little of inert gas to escape and contributes, in such a way, to renewal of the gas and to the fall of gas temperature in the inside of the second length 8.

The cable after being passed through the traction wheel means 11 is collected by the coiler 12.

Said first length 7 being shaped as a complete catenary arc having the convexity directed downwardly, permits the cable advancing through it to be subjected to the right traction and to remain suspended without touching the walls. In fact, in this first length 7, the extruded material, which gets gradually cross-linked by virtue of the heating, is still too soft to bear the contact with the internal walls of the vulcanizing tube 6 and to tolerate sliding contact with them.

The right traction is obtained with a means 60 and 61, of a known type, which co-ordinates the speeds of the wheel means 11 and 3 by controlling the displacement of the cable catenary so that the cable is placed with respect to a prefixed catenary curve position corresponding to the catenary shape of the length 7.

In the second length 8, corresponding to the cooling zone, the cable covering, which is already cross-linked, rests on the internal surface of the vulcanizing tube 6. The light film of non-aqueous liquid, preferably silicone oil, which adheres to the cable, facilitates the sliding. Of course, due to the continuous removal of the non-aqueous liquid, the level of this latter tends to lower in the first length 7. Said lowering is immediately noticed by the level governor 31 of the container 27, which, operating appropriate means including the pump 40 causes the inlet of new non-aqueous liquid from the tank 20.

Particularly, it is to be noted that, the line forming the object of the invention has the great advantage, with respect to the lines having vulcanizers of a known type, of allowing a complete cross-linking or cooling, both of the initial part and/or of the final part of the cable. In fact, the symmetrical catenary shape of the first length 7 of the vulcanizing tube 6 is of a particular importance to permit the cross-linking of the cable initial part. Because of the shape of the first length 7, it is possible to supply hot liquid into the first length 7 when the telescopic tube 5 is open. If the length 7 did not have a shape permitting the filling thereof with the tube 5 open, supply of liquid into the vulcanizing tube could be made only when the telescopic tube 5 is closed and therefore only with the cable already moving which would cause great difficulties in starting the line.

As a matter of fact, the filling of the heating zone requires time, and therefore, the cable for a relatively long length, would advance without being immersed in the liquid. In these conditions, the initial extruded mass would not undergo the cross-linking process. In this case, moreover, not only would there be the loss of the cable initial part because of lack of cross-linking, but also, there could be the greater risk of the slippage of the cable head, not sufficiently hardened, which rubs against the bottom of the internal wall of the vulcanizing tube 6 or the final sealing means 10.

At the end of the treatment of the cable length, in order to utilize also the final part of the cable, the line is stopped when the last portion of the cable length has entered in the vulcanizing tube 6, and the rear cable end is still held at the opening of the extruder 4. If the line is operated until the whole cable has come out of the final sealing means 10, the final part of the cable would not be supported at its rearmost end and would slide on the bottom of the first length 7.

Instead, by stopping the line as described, the final part of the cable remains suspended in the first length 7, and in this way the extruded covering can cross-link with the final part in its proper position.

However, with the line thus stopped, the cable part contained in the first length 7, does not advance and therefore, cannot be passed into the second length 8 or cooling zone. In order to cool also this zone, the non-aqueous liquid is withdrawn from the first length 7 and from the associated pipe 18, by making it flow back into the tank 20. As the non-aqueous liquid withdraws, inert gas under pressure is let into its place, being supplied, for example, from the same feeding source 30.

When all the first length 7 and the pipe 18 have been filled with inert gas, the valves 33 and 34 are closed and, instead, the valve 35 is opened to connect the additional duct or pipe 36 to the pipes 18 and 24 and to make a closed circuit comprising, in addition to the first and second lengths 7 and 8, i.e. substantially the whole vulcanization tube 6, the pipes 18, 36 and 24. The blower 25 then starts a circulation of inert gas in said closed circuit. The result is that the cable part which was held in the first length 7 is also cooled.

For the sake of simplicity in describing the invention, the example illustrated in the drawings and described in the previous description, has been referred to as a line having only one extruder, but of course, it is to be understood that the invention includes also the case, which is more generally used, in which more extruders are used. In fact, the more common combination includes the presence of three extruders of which one has the function of applying directly on the conductor a thin layer of semi-conductive material as internal electrostatic screen, a second extruder applies the insulating material and a third one applies another thin layer of semi-conductive material as external electrostatic screen.

Generally, the first extruder is provided with a distinct extrusion head and is arranged in series with the other two which, instead, have a common extrusion head. In this case, when the conductor is unwound, two decoilers can be used, instead of one, in order to speed up the transfer from one coil to the other and to permit, with the help of a cable accumulator, the continuity of the operation without stopping the line. For the same reason, two coilers, instead of only one, will, in general, be used for the winding of the sheathed insulated cable 13.

Although preferred embodiments of the present invention have been described and illustrated, it will be apparent to those skilled in the art that various modifications may be made without departing from the principles of the invention.

The embodiments of the invention in which an exclusive property or privilege is claimed are defined as follows:

1. Continuous vulcanizing apparatus comprising a tube having a vulcanizing section and a cooling section in series with each other, the vulcanizing section having the shape of catenary arc with the convex side thereof facing downwardly and with portions thereof on opposite sides of the apex of the arc at the same level and the cooling section being rectilinear and disposed with its axis as an extension of the axis of the vulcanization section where the cooling section joins the vulcanizing section, said axis of said cooling section thereby extending upwardly, means for supplying a non-aqueous, heating liquid to said vulcanizing section, means connected to spaced portions of the vulcanizing section for circulating said liquid in said vulcanizing section, means for supplying a cooling, inert gas to said cooling section, means connected to spaced portions of the cooling section for circulating said gas in said cooling section, said vulcanizing section being open at its one end to the adjacent cooling section to permit said gas to contact said liquid, means for closing said vulcanizing section at its opposite end and means for closing said cooling section at its end remote from the vulcanizing section to permit said liquid and said gas to be under pressure within said tube, means for supplying a conductor with unvulcanized material thereon into said tube at said opposite end of said vulcanizing section, and means for withdrawing said conductor with the material thereon after vulcanization from said end of said cooling section remote from said vulcanizing section.

2. Continuous vulcanizing apparatus as set forth in claim 1 further comprising means for supplying an inert gas to said tube at said opposite end thereof to provide a pocket of said gas intermediate said opposite end and said liquid.

3. Continuous vulcanizing apparatus as set forth in claim 2 wherein the inert gas supplied to said opposite end of said tube is the same as the gas in said cooling section.

4. Continuous vulcanizing apparatus as set forth in claim 1, 2 or 3 further comprising means for maintaining the liquid level in said vulcanizing section at a predetermined level comprising a tank for receiving said liquid and disposed with a portion thereof below said opposite end of said vulcanizing section, liquid supplying means for supplying said liquid to said tank, means responsive to the level of said liquid in said tank and connected to said liquid supplying means for controlling the supply of said liquid to said tank and means connecting said tank to said tube at said opposite end of said vulcanizing section for liquid flow between said tank and said tube.

5. Continuous vulcanizing apparatus as set forth in claim 1, 2 or 3 further comprising means for optionally interconnecting said means for circulating said liquid and said means for circulating said gas whereby in the absence of liquid in said vulcanizing section, said gas can be circulated through both said vulcanizing section and said cooling section.

6. Continuous vulcanizing apparatus as set forth in claim 1 or 2 further comprising means for heating the vulcanizing section of said tube.

7. Continuous vulcanizing apparatus comprising a closed tube having a vulcanizing section in series with a cooling section, the vulcanizing section having the shape of a catenary arc with the convex side thereof facing downwardly and with portions on opposite sides of the peak of the arc at the same level and the cooling section being rectilinear and disposed with its axis extending upwardly and tangent to the axis of the vulcanizing section at the one end of the latter adjoining the cooling section, said vulcanizing section having a heated, non-aqueous liquid under pressure therein and the surface of the liquid at said one end of the vulcanizing section being substantially the same as the surface level of the liquid at the opposite end of said vulcanizing section, a cooling, inert pressurized gas in said cooling section, said one end of said vulcanizing section being open to said cooling section to permit said gas to contact the surface of said liquid at said one end of said vulcanizing section, means connected to said vulcanizing section for circulating said liquid in said vulcanizing section, means connected to said cooling section for circulating said gas in said cooling section, means for supplying a conductor with material thereon to be vulcanized into said tube at said opposite end thereof, and means for removing said conductor from said tube at the end of said cooling section remote from said vulcanizing section after said material has been vulcanized.

8. Continuous vulcanizing apparatus as set forth in claim 7 further comprising a pressurized inert gas in said tube at said opposite end of said vulcanizing section and contacting said liquid.

9. Continuous vulcanizing apparatus as set forth in claim 8 further comprising means connected to the vulcanizing section of said tube for maintaining the liquid in said vulcanizing section at a predetermined level.

10. Continuous vulcanizing apparatus as set forth in claim 7 or 8 further comprising means for circulating a cooling gas in said vulcanizing section in the absence of said liquid therein.

* * * * *